United States Patent
Tuli et al.

(10) Patent No.: US 9,544,444 B2
(45) Date of Patent: Jan. 10, 2017

(54) DIFFERENTIATED MMS BILLING BASED ON ROAMING STATUS DETERMINATION OF USER DEVICES

(71) Applicant: Verizon Patent and Licensing Inc., Arlington, VA (US)

(72) Inventors: Amol Tuli, Dublin, CA (US); Sethumadhav Bendi, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 14/486,621

(22) Filed: Sep. 15, 2014

(65) Prior Publication Data

US 2016/0080579 A1 Mar. 17, 2016

(51) Int. Cl.
| | |
|---|---|
| H04M 15/00 | (2006.01) |
| H04W 4/12 | (2009.01) |
| H04W 8/00 | (2009.01) |
| H04W 4/26 | (2009.01) |

(52) U.S. Cl.
CPC ......... *H04M 15/8038* (2013.01); *H04M 15/41* (2013.01); *H04W 4/12* (2013.01); *H04W 8/005* (2013.01); *H04M 2215/146* (2013.01); *H04M 2215/34* (2013.01); *H04W 4/26* (2013.01)

(58) Field of Classification Search
CPC .................................................. H04M 15/00
See application file for complete search history.

(56) References Cited

U.S. PATENT DOCUMENTS

| | | | |
|---|---|---|---|
| 2001/0021651 A1* | 9/2001 | Burgaleta-Salinas | H04M 15/00 455/433 |
| 2005/0047378 A1* | 3/2005 | Wuschke | H04M 15/00 370/338 |
| 2006/0004643 A1* | 1/2006 | Stadelmann | G06Q 30/04 705/34 |
| 2008/0020704 A1* | 1/2008 | Costa | H04M 15/00 455/3.06 |
| 2008/0109331 A1* | 5/2008 | Stadelmann | G06Q 20/123 705/34 |
| 2009/0209229 A1* | 8/2009 | Cai | H04L 12/1403 455/406 |
| 2010/0048165 A1* | 2/2010 | Caldwell | H04M 15/41 455/406 |
| 2014/0273969 A1* | 9/2014 | Zhang | H04L 63/101 455/411 |
| 2014/0357219 A1* | 12/2014 | Nicolaescu | H04M 15/8038 455/406 |

* cited by examiner

*Primary Examiner* — Mazda Sabouri

(57) ABSTRACT

A first device may receive an indication that a multimedia message service (MMS message) message has been sent from a first user device to a second user device; obtain, from a second device, the roaming status of the first user device at a time that the MMS message was sent by the first user device; generate a call details record (CDR) indicating the obtained roaming status of the first user device at the time the MMS message was sent by the first user device; and store or output the CDR to a billing system that charges an account, associated with the first user device, for sent MMS message. An amount charged by the billing system may be based on the roaming status of the first user device at the time at which MMS message are sent by the first user device.

20 Claims, 11 Drawing Sheets

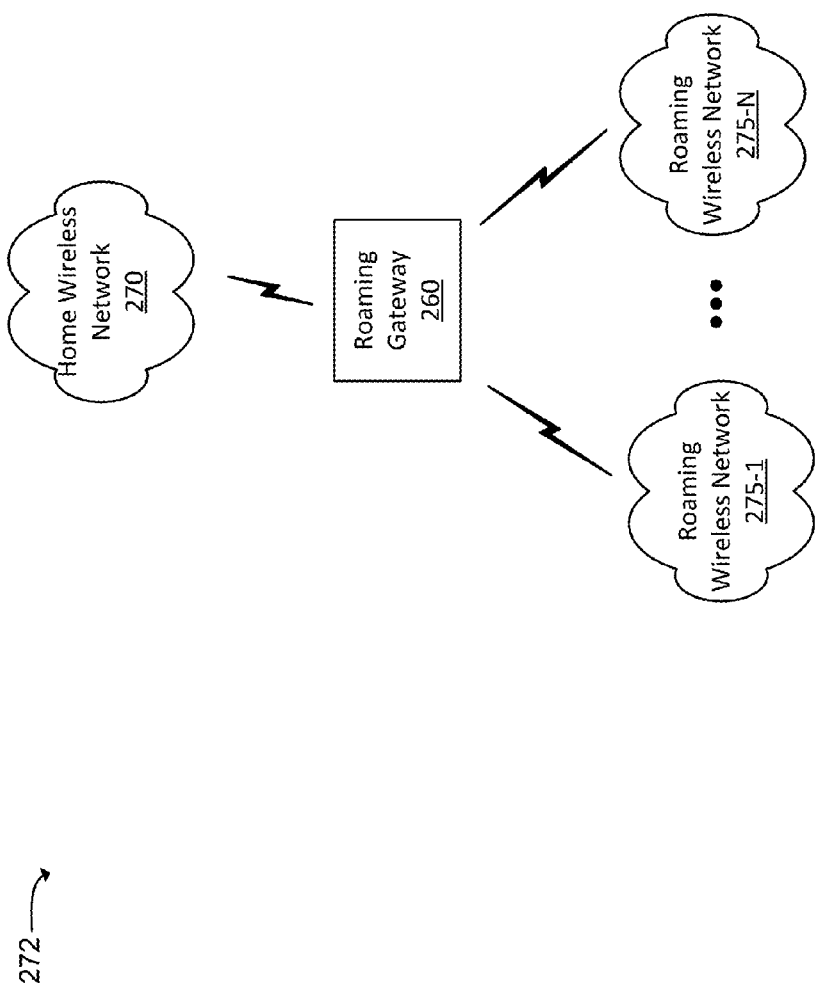

US 9,544,444 B2

DIFFERENTIATED MMS BILLING BASED ON ROAMING STATUS DETERMINATION OF USER DEVICES

BACKGROUND

A user device, such as a mobile telephone, may communicate with a "home" cellular network associated with a user's telecommunications service provider. In some situations, such as when the user of the user device travels outside of a "home" geographic region, the user device may communicate with a "roaming" cellular network (e.g., a cellular network associated with a different service provider than the "home" cellular network). A user account, associated with the user device, may be billed at different rates based on network usage of the "home" cellular network and of the "roaming" cellular network. For example, when the user device is used to send and/or receive a message, such as a multimedia message service (MMS) message, the user account may be billed at a different rate depending on whether the user device was connected to the "home" cellular network, or the "roaming" cellular network when sending or receiving the MMS message.

BRIEF DESCRIPTION OF THE DRAWINGS

FIGS. 2A and 2B illustrate example environments in which systems and/or methods, described herein, may be implemented;

DETAILED DESCRIPTION OF THE PREFERRED EMBODIMENTS

The following detailed description refers to the accompanying drawings. The same reference numbers in different drawings may identify the same or similar elements.

When a user device is used to send a multimedia service (MMS) message via a cellular network, an application server (e.g., a multimedia messaging service center (MMSC)) may receive the MMS message, store the MMS message, and notify a recipient that an MMS message is available for the recipient. The recipient may retrieve the stored MMS message from the MMSC.

In order to properly charge an account of a user device associated with the MMS message (e.g., an account of a sender or recipient user device), the "roaming status" of the user device may need to be determined (e.g., whether the user device was connected to a "home" network or a "roaming" network when the user device sent or received the MMS message) in order to properly bill the account. Determining the roaming status (e.g., at the application layer, such as for an MMS application) can be a complex process, involving many different devices in both the home and roaming networks.

Systems and/or methods, as described herein, may streamline the determination of the roaming status of a user device (e.g., at the application layer) when the user device sends or receives an MMS message. For example, the roaming status of a user device may be "pushed" to a roaming status determination component as the roaming status of the user device changes (e.g., as the user device travels between home and roaming networks). When the user device is used to send or receive an MMS message, the roaming status determination component may determine the roaming status of the user device at the time the MMS message was sent or received by the user device. That is, the roaming status determination component may determine whether the user device sent or received the MMS message via a home or roaming wireless network. The roaming status determination component may indicate the roaming status of the user device to a billing system so that the billing system may charge the account of the user device based on the roaming status at the time that the MMS message was sent or received by the user device.

Figure 1:
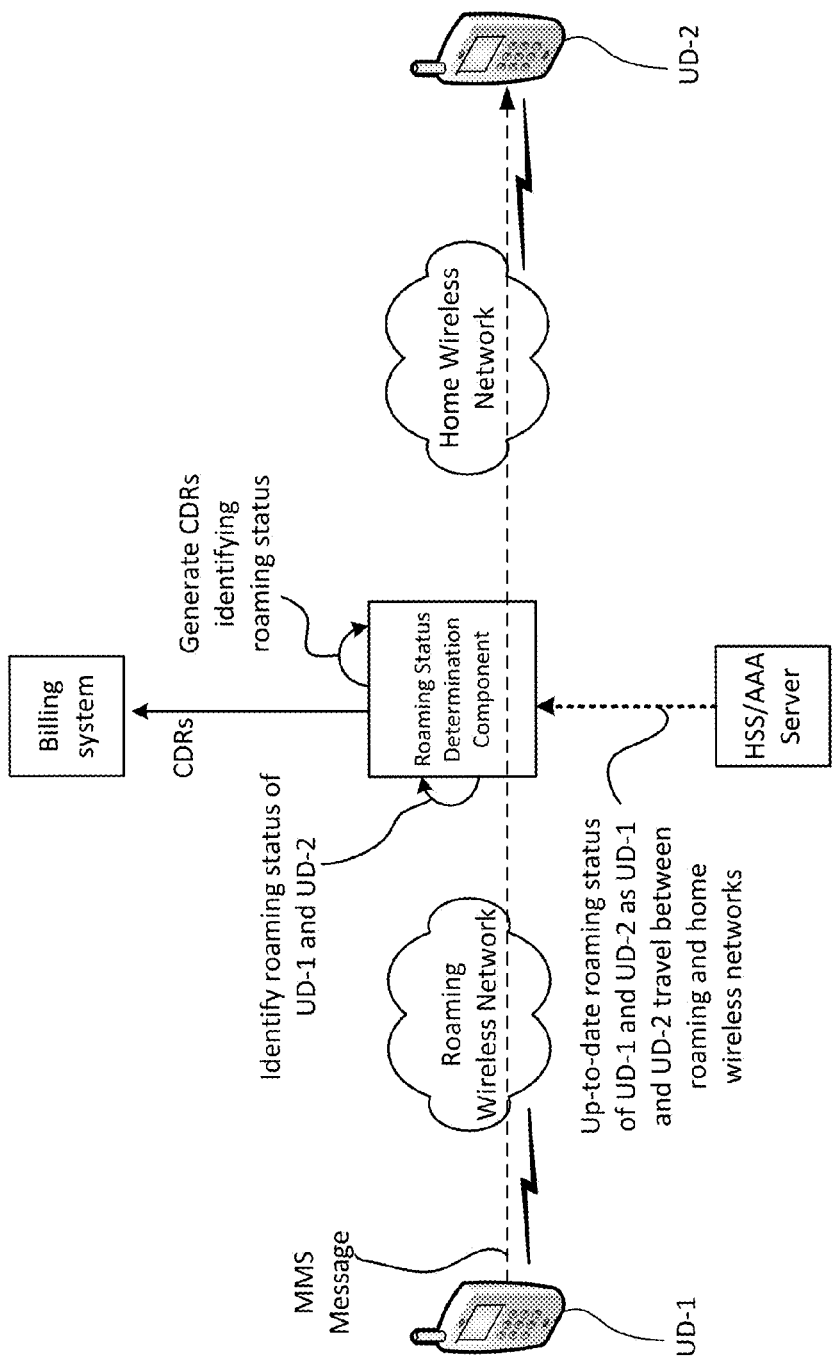
FIG. 1 illustrates an example overview of an implementation described herein.

FIG. 1 illustrates an example overview of an implementation described herein. As shown in FIG. 1, a first user device (UD-1) may be connected with a roaming wireless network (e.g., a wireless network that is associated with a different service provider than a home wireless network associated with UD-1). A second user device (UD-2) may be connected with a home wireless network associated with UD-2.

A home subscriber server (HSS)/authentication, authorization, accounting (AAA) server (referred to as an "HSS/AAA server") may store registration information identifying wireless networks with which UD-1 and UD-2 are currently connected. For example, the HSS/AAA server may store registration information identifying that UD-1 is connected to a roaming wireless network and is, hence, in a roaming status. Similarly, the HSS/AAA server may store registration information indicating that UD-2 is connected to a home wireless network and is, hence, in a non-roaming status. As shown in FIG. 1, the HSS/AAA server may output up-to-date roaming status of UD-1 and UD-2 to a roaming status determination component.

When UD-1 sends an MMS message to UD-2, the roaming status determination component may identify the roaming status of UD-1 and UD-2 at the time UD-1 sent the message and at the time when UD-2 received the message. The roaming status determination component may then generate a call details record (CDR) indicating the roaming status of UD-1 when UD-1 when UD-1 sent the MMS message, and/or may generate a CDR indicating the roaming status of UD-2 when UD-2 retrieved the MMS message (e.g., from an MMSC). The roaming status determination component may output the CDRs to a billing system, so that the billing system can charge an account associated with UD-1 and UD-2 based on the roaming statuses.

Figure 2A:
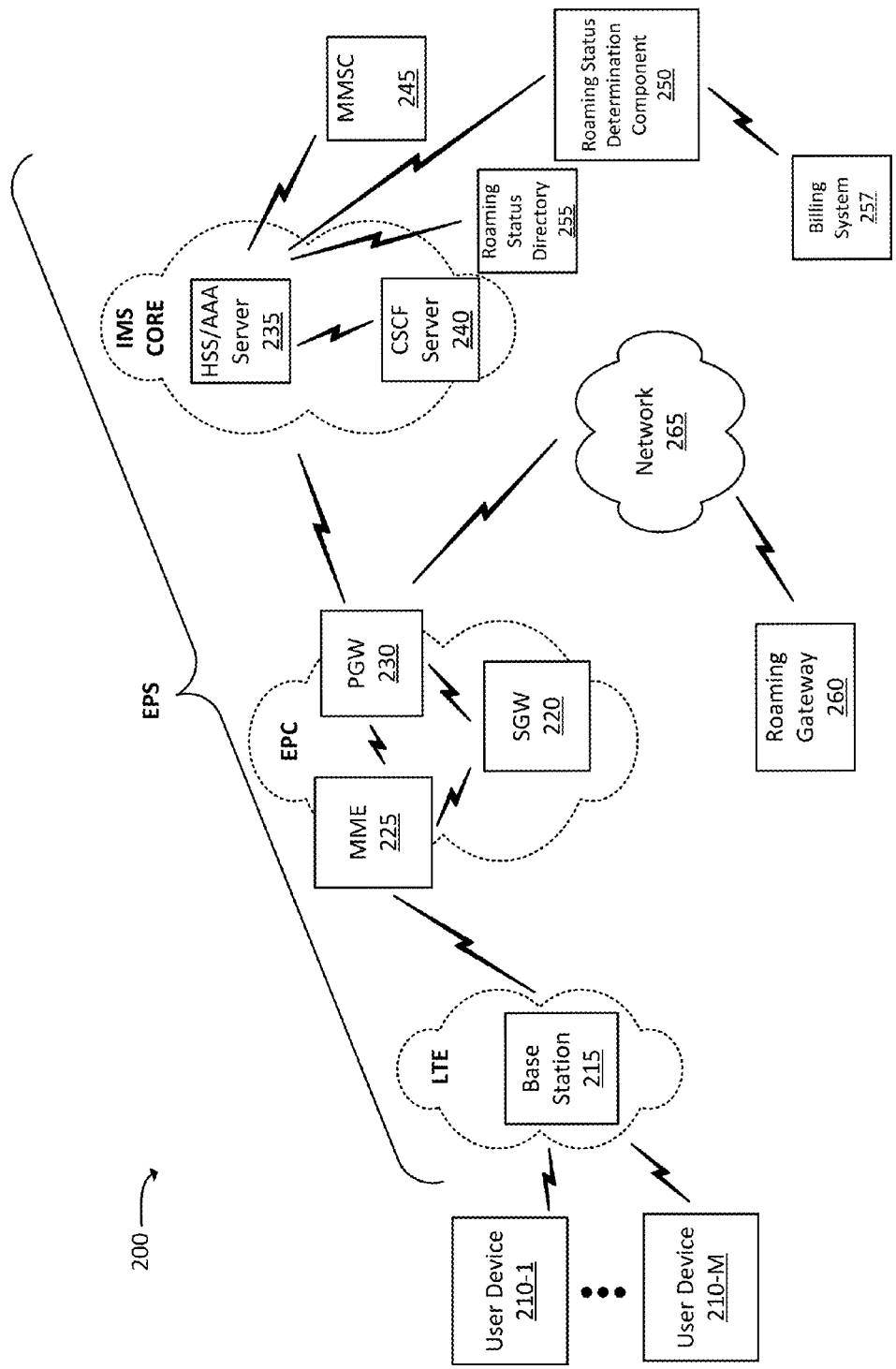

FIGS. 2A and 2B illustrate example environments in which systems and/or methods, described herein, may be implemented. As shown in FIG. 2A, environment 200 may include user devices 210-1 through 210-M (where M is an integer greater than or equal to 1), base station 215, serving gateway (SGW) 220, mobility management entity device (MME) 225, packet data network (PDN) gateway (PGW)

230, HSS/AAA server 235, call service control function (CSCF) server 240, MMSC 245, roaming status determination component 250, roaming status directory 255, roaming gateway 260, and network 265.

Environment 200 may include an evolved packet system (EPS) having a radio access network (RAN), that is associated with a long-term evolution (LTE) network and/or some other type of network, and an evolved packet core (EPC) that operate based on a third generation partnership project (3GPP) wireless communication standard. The RAN network may include one or more base stations, such as evolved Node Bs (eNBs), via which user device 210 communicates with the EPC. The EPC may include SGW 220, MME 225, and/or PGW 230 and may enable user device 210 to communicate with network 265 and/or an Internet protocol (IP) multimedia subsystem (IMS) core. The IMS core may include HSS/AAA server 235 and CSCF server 240, and may process telephone calls and/or other types of communications on behalf of user device 210, and may manage authentication, connection initiation, account information, user profile information, etc. associated with user device 210.

User device 210 may include a computation or communication device, such as a wireless mobile communication device that is capable of communicating with base station 215 and/or a network (e.g., network 265, home wireless network 255, and/or roaming wireless network 265). For example, user device 210 may include a radiotelephone, a personal communications system (PCS) terminal (e.g., a device that combines a cellular radiotelephone with data processing and data communications capabilities), a personal digital assistant (PDA), a smart phone, a laptop computer, a tablet computer, a camera, a personal gaming system, or another type of computation or communication device. User device 210 may send data to and/or receive data from network 265.

Base station 215 may include one or more network devices that receive, process, and/or transmit traffic, such as audio, video, text, and/or other data, destined for and/or received from user device 210. In an example implementation, base station 215 may be an eNB device and may be part of the LTE network. Base station 215 may receive traffic from and/or send traffic to network 265 via SGW 220 and PGW 230. Base station 215 may send traffic to and/or receive traffic from user device 210 via an air interface. One or more of base stations 225 may be associated with a RAN.

SGW 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 220 may, for example, aggregate traffic received from one or more base stations 225 and may send the aggregated traffic to network 265 via PGW 230. In one example implementation, SGW 220 may route and forward user data packets, may act as a mobility anchor for a user plane during inter-eNB handovers, and may act as an anchor for mobility between LTE and other 3GPP technologies.

MME 225 may include one or more network devices that perform operations associated with a handoff to and/or from the EPS. MME 225 may perform operations to register user device 210 with the EPS, to handoff user device 210 from the EPS to another network, to handoff a user device 210 from the other network to the EPS, and/or to perform other operations. MME 225 may perform policing operations for traffic destined for and/or received from user device 210.

MME 225 may authenticate user device 210 (e.g., via interaction with HSS/AAA server 235).

PGW 230 may include one or more network devices, such as a gateway, a router, a modem, a switch, a firewall, a NIC, a hub, a bridge, a proxy server, an OADM, or some other type of device that processes and/or transfers traffic. PGW 230 may, for example, provide connectivity of user device 210 to external packet data networks by being a traffic exit/entry point for user device 210. PGW 230 may perform policy enforcement, packet filtering, charging support, lawful intercept, and/or packet screening. PGW 230 may also act as an anchor for mobility between 3GPP and non-3GPP technologies.

HSS/AAA server 235 may include one or more computing devices, such as a server device or a collection of server devices that may receive registration information when user device 210 attaches to base station 215 (e.g., a base station 215 associated with a home network of user device 210 or a roaming network of user device 210). For example, user device 210 may register with an HSS/AAA server 235 associated with a home network of user device 210 when user device 210 attaches to a base station 215 associated with either a home network or a roaming network. HSS/AAA server 235 may use the registration information to determine the roaming status of user device 210. For example, HSS/AAA server 235 may determine whether user device 210 is attached to a base station 215 associated with a home network of user device 210 (a non-roaming status), or if user device 210 is attached to a base station 215 associated with a roaming network (e.g., a roaming status).

In some implementations, HSS/AAA server 235 may manage, update, and/or store, in a memory associated with HSS/AAA server 235, profile information associated with user device 210 that identifies applications and/or services that are permitted for and/or accessible by user device 210, such as roaming network access services, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 235 may include a device that performs authentication, authorization, and/or accounting operations associated with a communication connection with user device 210.

CSCF server 240 may include one or more computing devices that process and/or route IMS traffic to and from user device 210 via the EPC. For example, CSCF server 240 may process traffic, associated with services provided by the IMS core, that is destined for user device 210. In another example, CSCF server 240 may process traffic, received from user device 210, that are destined for the IMS core.

MMSC 245 may include one or more computing devices that may receive an MMS message from a sending user device 210 (e.g., user device 210-1), store the MMS message, output a notification regarding the availability of the message to a recipient user device 210 (e.g., user device 210-2), and output the message to user device 210-2 (e.g., when user device 210-2 requests the message after receiving the notification).

Roaming status determination component 250 may include one or more computing devices. In some implementations, some or all of roaming status determination component 250 may be implemented as software within MMSC 245. Roaming status determination component 250 may communicate with roaming status directory 255 to determine the roaming status of user device 210-1 and user device 210-2. Roaming status determination component 250 may generate a CDR indicating the roaming status of user device 210-1 and/or user device 210-2 when a message is sent or received by user device 210-1 and/or user device 210-2.

Roaming status directory 255 may include one or more computing devices that may store information identifying the roaming status of user devices 210. In some implementations, roaming status directory 255 may receive the information identifying the roaming statuses from HSS/AAA server 235 via roaming status determination component 250. Additionally, or alternatively, roaming status directory 255 may receive the information identifying the roaming statuses directly from HSS/AAA server 235. In some implementations, roaming status directory 255 may maintain a directory according to an LDAP protocol and/or may use another technique or protocol or store information regarding the roaming statuses of user devices 210. In some implementations, roaming status directory 255 may store information identifying the roaming statuses of user devices 210 associated with different network service providers.

Billing system 257 may include one or more server devices that may receive CDRs from roaming status determination component 250. In some implementations, billing system 257 may maintain billing information and may assess charges and credits to an account associated with user device 210 based on network usage information received from the EPC, MMSC 245, roaming status determination component 250, and/or roaming gateway 260.

Roaming gateway 260 may include one or more computing devices, such as a server device or a collection of server devices. While roaming gateway 260 is shown as a separate device connected to network 265, in practice, roaming gateway 260 may be coupled to or implemented within PGW 230. Additionally, roaming gateway 260 may include one or more network devices, such as a gateway, a router, a modem, a switch, a firewall, a NIC, a hub, a bridge, a proxy server, an OADM, and/or or some other type of device that processes and/or transfers traffic. In some implementations, roaming gateway 260 may permit user device 210 to access devices of a home wireless network when user device 210 is connected to a roaming wireless network. For example, user device 210 may communicate with an HSS/AAA server 235 and/or an MMSC 245, associated with the home network of user device 210, via roaming gateway 260 when user device 210 is connected to a roaming wireless network.

Network 265 may include one or more wired and/or wireless networks. For example, network 265 may include a cellular network (e.g., a second generation (2G) network, a third generation (3G) network, a fourth generation (4G) network, a fifth generation (5G) network, an LTE network, a global system for mobile (GSM) network, a code division multiple access (CDMA) network, an evolution-data optimized (EVDO) network, or the like), a public land mobile network (PLMN), and/or another network. Additionally, or alternatively, network 265 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Referring to FIG. 2B, environment 272 may include roaming gateway 260, home wireless network 270, and roaming wireless networks 275-1 through 275-N (where N is an integer greater than or equal to 1), sometimes referred to herein individually as "roaming wireless network 275." Home wireless network 270 and/or roaming wireless networks 275 may include components shown in FIG. 2A. For example, home wireless network 270 and/or roaming wireless networks 275 may each include a RAN (e.g., an LTE network), a backhaul network (e.g., an EPC network), and/or an IMS core. Thus, in some implementations, wireless network 255 and/or roaming wireless networks 275 may each include one or more base stations 215, one or more SGWs 220, one or more MMEs 225, one or more PGWs 230, one or more HSS/AAA servers 235, and/or one or more CSCF servers 240. Home wireless network 270 may be a "home" network with respect to a particular user device 210, while roaming wireless networks 275 may be "roaming" networks with respect to the particular user device 210.

When user device 210 is connected to roaming wireless network 275, user device 210 may communicate with devices of home wireless network 270 via roaming gateway 260. For example, when user device 210 is connected to roaming wireless network 275, user device 210 may register with an HSS/AAA server 235 associated with the home wireless network 270 of user device 210. Communications relating to the registration of user device 210 with HSS/AAA server 235 may be transmitted via roaming gateway 260. Also, user device 210 may communicate with MMSC 245 associated with the home wireless network 270 (e.g., via roaming gateway 260) to send or receive MMS messages. Home wireless network 270 may communicate with roaming gateway 260 to provide service validation responses, indicating whether user device 210 is permitted to access roaming wireless network 275.

In some implementations, a home wireless network 270, with respect to one user device 210, may be a roaming wireless network 275 with respect to another user device 210. Further, a roaming wireless 220, with respect to one user device 210, may be a home wireless network 275 with respect to another user device 210.

The quantity of devices and/or networks in environment is not limited to what is shown in FIGS. 2A and 2B. In practice, environments 200 and/or 272 may include additional devices and/or networks; fewer devices and/or networks; different devices and/or networks; or differently arranged devices and/or networks than illustrated in FIGS. 2A and 2B. Also, in some implementations, one or more of the devices of environments 200 and/or 272 may perform one or more functions described as being performed by another one or more of the devices of environments 200 and/or 272. Devices of environments 200 and/or 272 may interconnect via wired connections, wireless connections, or a combination of wired and wireless connections.

Figure 3:
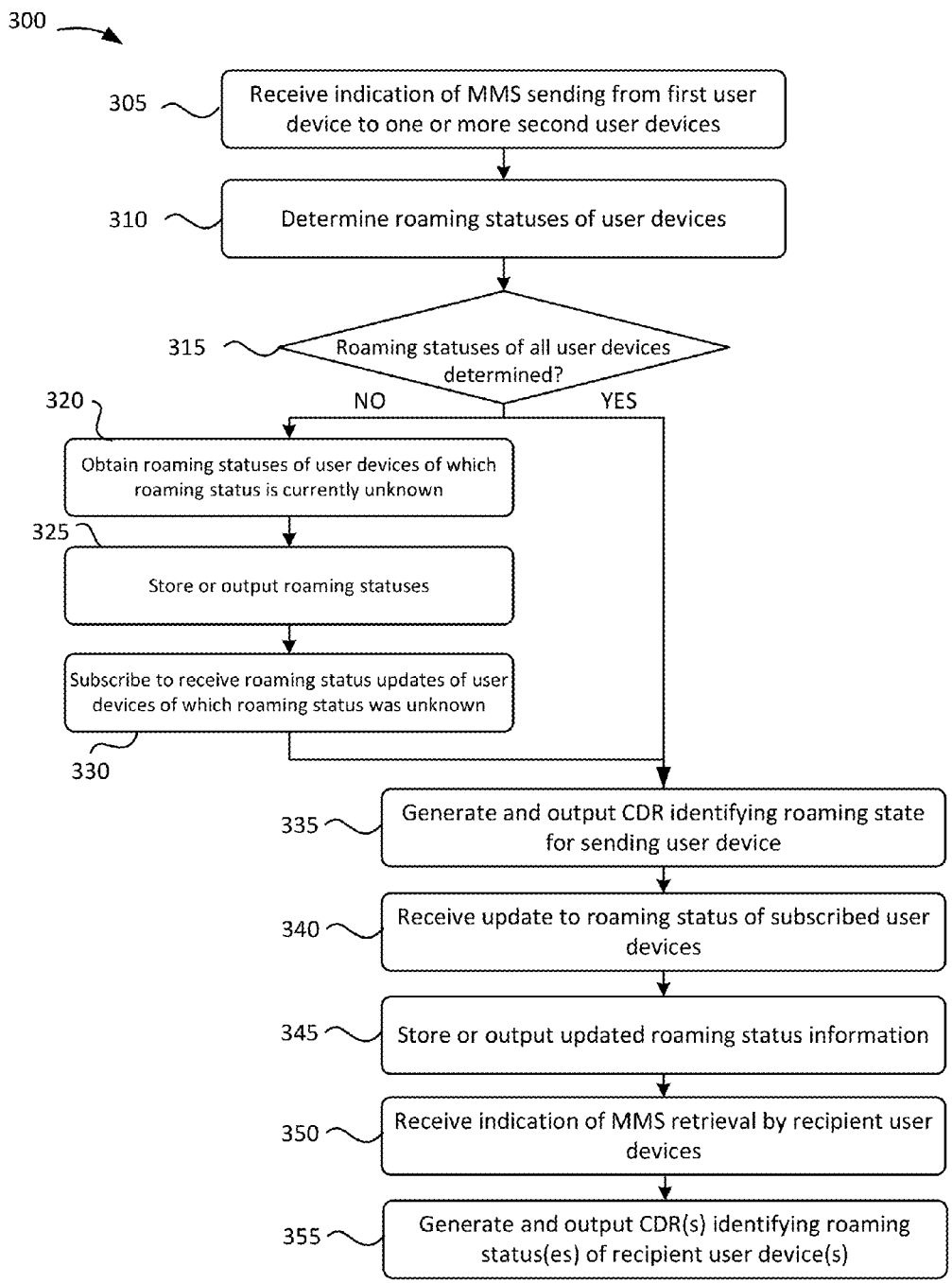
FIG. 3 illustrates a flowchart of an example process for determining the roaming status of user devices when the user devices send and/or receive MMS messages.

FIG. 3 illustrates a flowchart of an example process 300 for determining the roaming status of user devices when the user devices send and/or receive MMS messages. In some implementations, process 300 may be performed by roaming status determination component 250. In some implementations, some or all of blocks of process 300 may be performed by one or more other devices. For example, as mentioned above, in some implementations, roaming status determination component 250 may be implemented within MMSC 245.

As shown in FIG. 3, process 300 may include receiving an indication that an MMS message has been sent from a first user device to one or more second user devices (block 305). For example, roaming status determination component 250 may receive an indication that an MMS message has been sent from a first user device 210 (e.g., sender user device 210) to one or more second user devices 210 (e.g., recipient user device(s)). In some implementations, roaming status determination component 250 may receive the indication from one or more network devices, such as via MMSC 245.

When receiving the indication, roaming status determination component 250 may receive user identifications (IDs) of sender user device 210 and of recipient user device(s) 210 (e.g., telephone numbers, user device identifiers, etc.).

Process 300 may also include determining the roaming statuses of the user device(s) (block 310). For example, roaming status determination component 250 may request, from roaming status directory 255, information identifying the roaming statuses of sender user device 210 and recipient user device(s) 210. As part of the request, roaming status determination component 250 may output the user IDs of sender user device 210 and recipient user device(s) 210. As described above, roaming status directory 255 may store the roaming status for user devices 210. Roaming status directory 255 may look up the user IDs, and output the roaming statuses for sender user device 210 and recipient user device(s) 210. In some implementations, roaming status directory 255 may indicate that the roaming statuses for sender user device 210 and/or recipient user device(s) 210 are not available. For example, the roaming statuses may not be available if roaming status determination component 250 has not subscribed to receive roaming status updates from HSS/AAA server 235. For instance, if roaming status determination component 250 has not subscribed to receive roaming status updates, regarding a particular user device 210, from HSS/AAA server 235, then roaming status determination component 250 may not have reliable, up-to-date roaming status information regarding the particular user device 210.

Process 300 may further include determining whether the roaming statuses of all user devices 210 have been determined (block 315). For example, roaming status determination component 250 may determine that the roaming statuses of all user devices 210 (e.g., sender user device 210 and recipient user device(s) 210) have been determined when roaming status determination component 250 receives the roaming statuses for all user devices 210 from roaming status directory 255. Roaming status for user devices 210 may not be received from roaming status directory 255 if roaming status determination component 250 has not subscribed to receive roaming status updates for some user devices 210 from HSS/AAA server 235. As described below, roaming status determination component 250 may obtain the roaming status for user devices 210 of which the roaming status is currently unknown, store or output the roaming statuses, and subscribe to receive future roaming status updates for the user devices 210 of which the roaming status is currently unknown.

If, for example, the roaming statuses of all user devices have not been determined (block 315-NO), process 300 may include obtaining the roaming statuses of user devices for which the roaming status is currently unknown (block 320). For example, roaming status determination component 250 may request, from HSS/AAA server 235 (e.g., a "home" HSS/AAA server 235 associated with user devices 210), the roaming status for each user device 210 of which the respective roaming status is currently unknown. Roaming status determination component 250 may request the roaming status from a particular home HSS/AAA server 235 associated with a home network of each of the user devices 210 for which the roaming status is currently unknown. The request may include the user IDs of each of the user devices 210. Based on receiving the request, HSS/AAA server 235 may look up registration information for each user ID, determine the roaming status based on the registration information, and output the roaming status to roaming status determination component 250.

Process 300 may also include storing or outputting the roaming statuses (block 325). For example, roaming status determination component 250 may store the roaming statuses for user devices 210-1 and 210-2. Additionally, or alternatively, roaming status determination component 250 may output the roaming statuses to roaming status directory 255, and roaming status directory 255 may store the roaming statuses. Once the roaming statuses have been stored (e.g., either by roaming status determination component 250 and/or roaming status directory 255), roaming status determination component 250 may determine the roaming status of user devices 210-1 and 210-2 when subsequent MMS messages are sent and/or received.

Process 300 may further include subscribing to receive roaming status updates of user devices of which the roaming status was unknown (block 330). For example, roaming status determination component 250 may output a request to subscribe to roaming status updates for user devices 210 of which the roaming status was unknown (e.g., as determined in block 315). HSS/AAA server 235 may then begin to provide information regarding any changes to the roaming status of user devices 210 to roaming status determination component 250 (e.g., as user devices 210 travel to outside of home wireless networks).

Process 300 may include generating and outputting a CDR identifying a roaming status for the sending user device (block 335). For example, roaming status determination component 250 may generate a CDR for sender user device 210. Roaming status determination component 250 may generate a CDR for sender user device 210 when the MMS message notification is sent to recipient user device(s) 210. The CDR may identify the roaming status of sender user device 210 when sender user device 210 sent the MMS message. Roaming status determination component 250 may output the CDR to billing system 257, and billing system 257 may charge an account of sender user device 210 at a particular rate based on the roaming statuses indicated by the CDR.

Process 300 may also include receiving updates to roaming statuses of subscribed user device(s) (block 340). For example, roaming status determination component 250 may receive updates the roaming statuses of subscribed user devices 210, including the roaming statuses of newly subscribed user devices 210-1 and 210-2. Roaming status determination component 250 may receive the updates to roaming statuses as user devices 210-1 and 210-2 travel and connect to different networks (e.g., as user devices 210-1 and 210-2 travel in and out of communications range of home wireless networks 265 and roaming wireless networks 270).

Process 300 may also include storing or outputting updated roaming status information (block 345). For example, roaming status determination component 250 may store the updated roaming status information. Additionally, or alternatively, roaming status determination component 250 may output the updated roaming status information to roaming status directory 255. The updated roaming status information may be used to determine up-to-date roaming status of a user device 210 at the time user device 210 sends or receives an MMS message.

Process 300 may further include receiving an indication of MMS message retrieval by recipient user device(s) (block 350). For example, roaming status determination component 250 may receive an indication when recipient user device(s) 210 retrieve the MMS message from MMSC 245.

Process 300 may also include generating and outputting CDR(s) identifying roaming status(es) of recipient user device(s) (block 355). For example, roaming status determination component 250 may generate a CDR for each user device 210-2 when each user device 210-2 retrieves the MMS message from MMSC 245. The CDR may identify the roaming status of user device 210-2 when the MMS message is retrieved. Roaming status determination component 250 may output the CDRs to billing system 257, and billing system 257 may charge respective accounts of user devices 210-2 at particular rates based on the roaming statuses indicated by the CDRs.

If, on the other hand, the roaming statuses of all the user device(s) have been determined (block 315-YES), blocks 320, 325, and 330 may be omitted. For example, the roaming statuses of sender user device 210 and recipient user device (s) 210 may be determined if roaming status determination component 250 is already subscribed to receive roaming status updates for sender user device 210 and recipient user device(s) 210 from HSS/AAA server 235. In some implementations, blocks 340 and 345 may be omitted if updated roaming statuses are not output by HSS/AAA server 235 (e.g., when the roaming status recipient user device(s) 210 does not change from the time that the roaming status of recipient user device(s) 210 was originally determined (e.g., in blocks 310 and/or 320), and the time when the MMS message was retrieved by recipient user device(s) 210.

Figure 4:
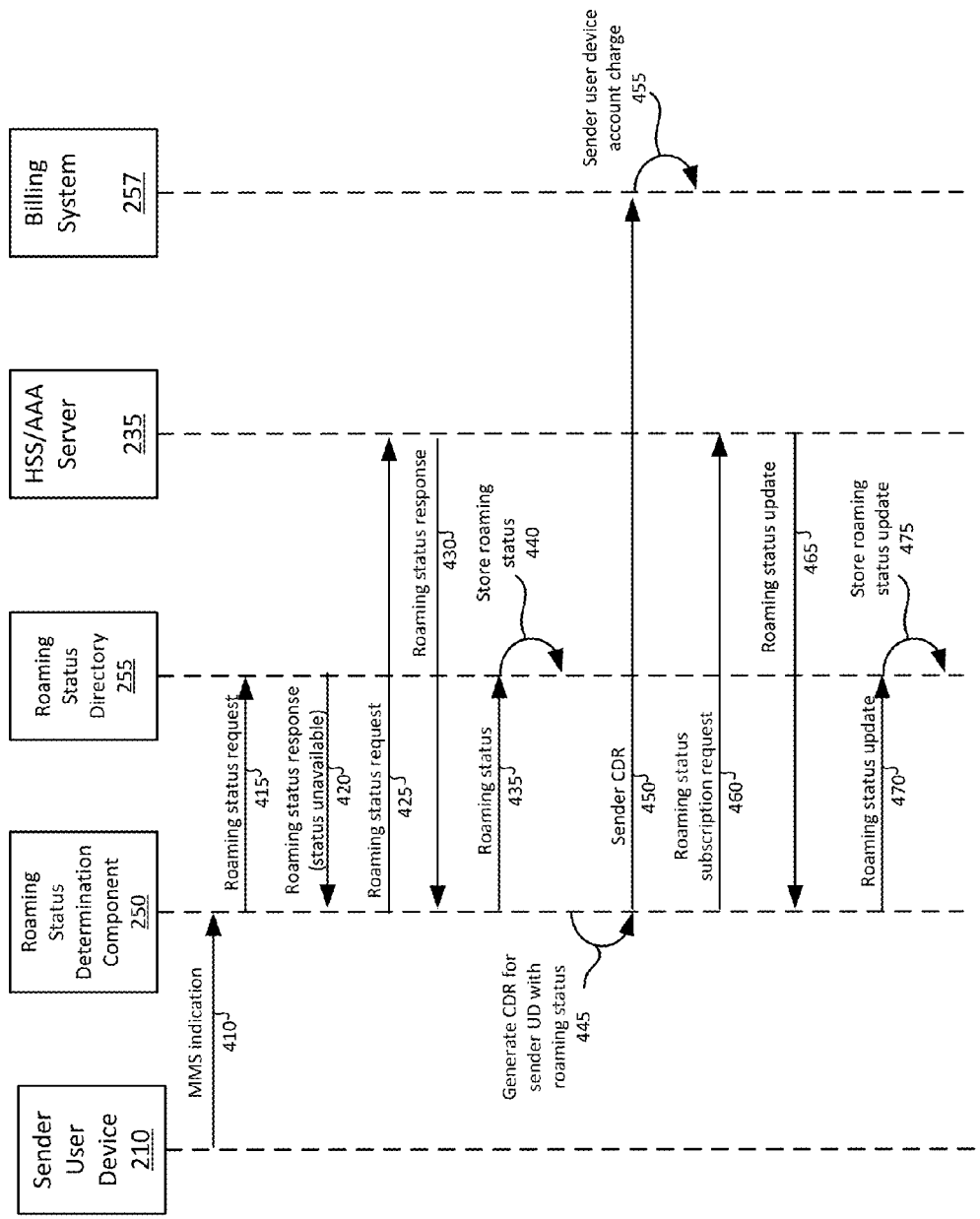
FIGS. 4-6 illustrate signal flows diagram of example operations for receiving up-to-date roaming status information and using the up-to-date roaming status information to bill users accordingly.
Figure 5:
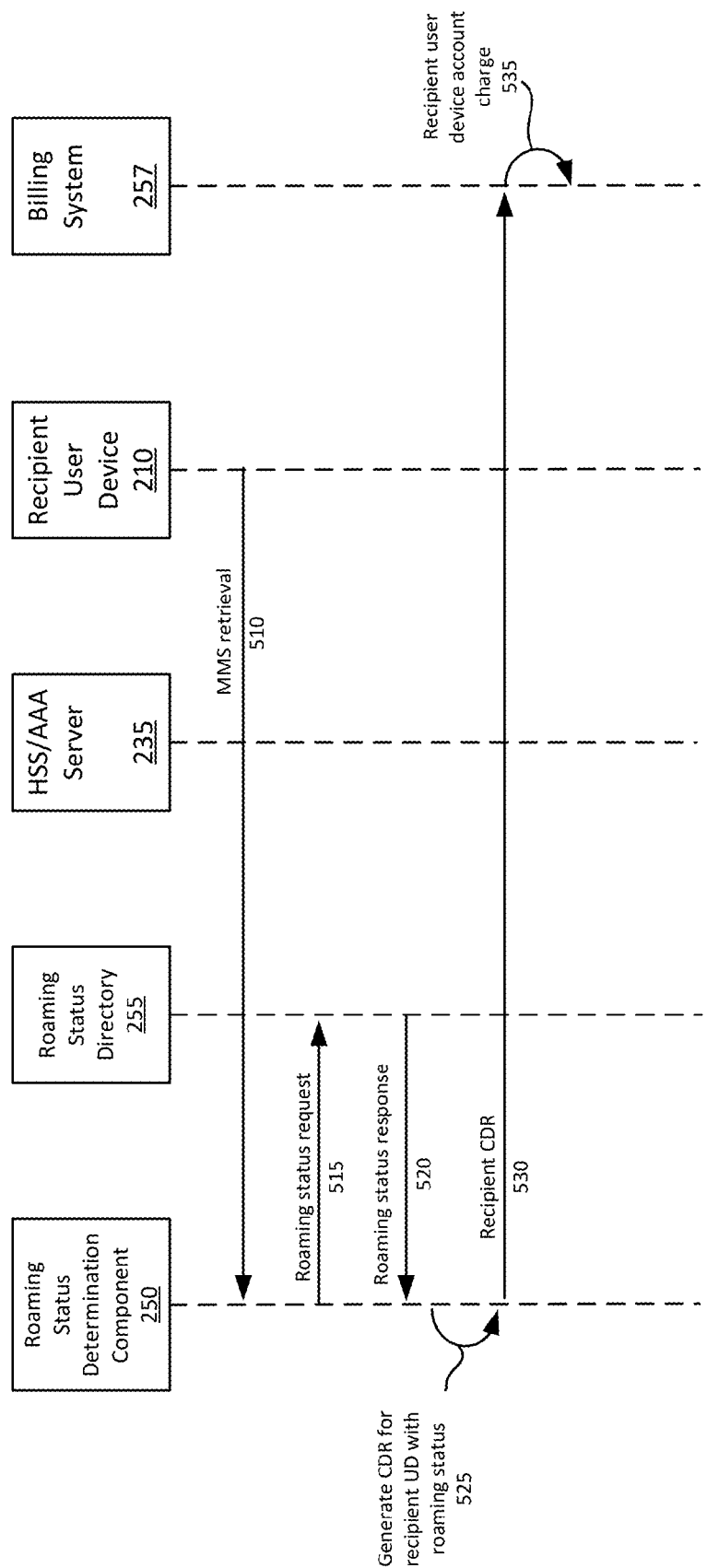
Figure 6:
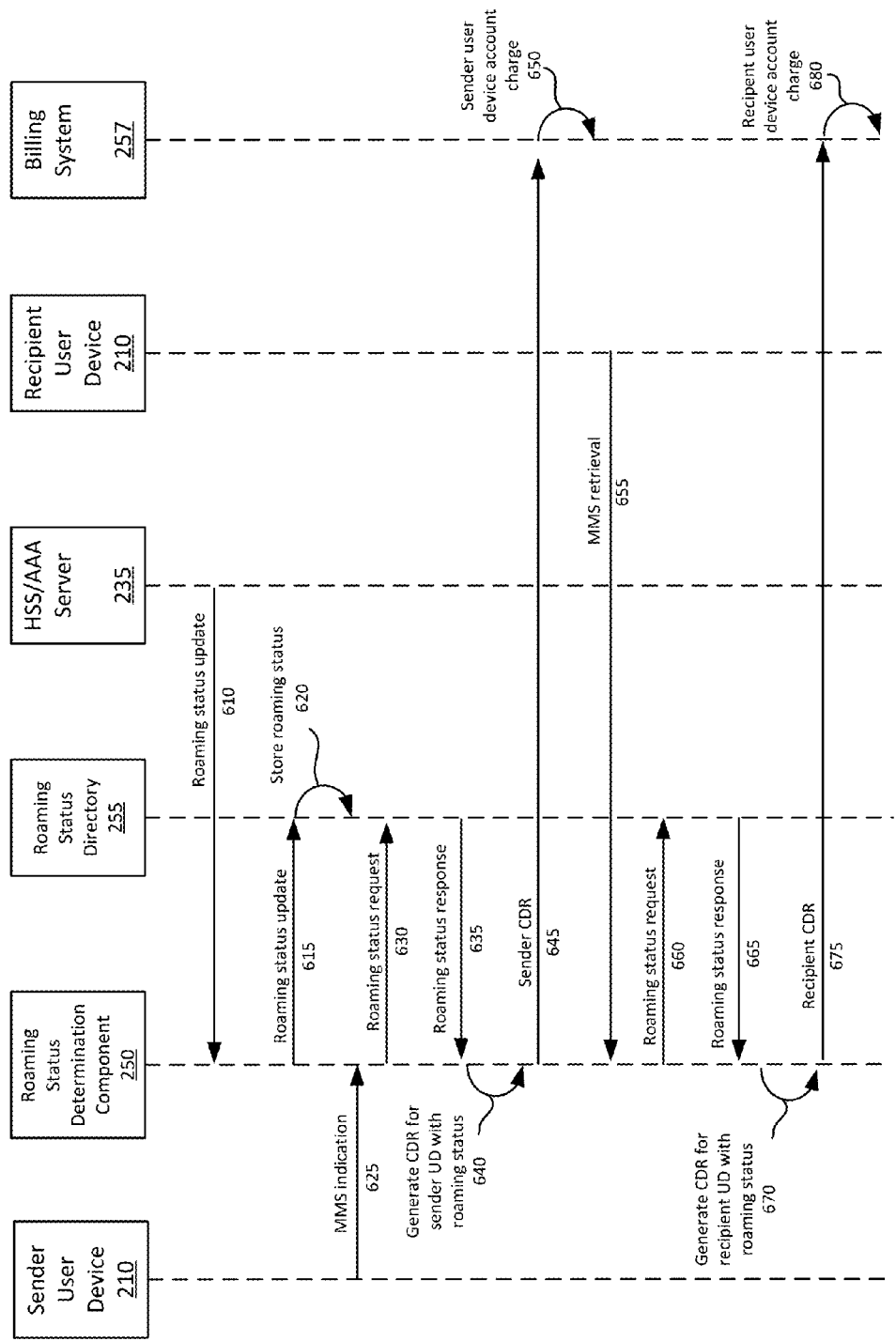

FIGS. 4-6 illustrate signal flows diagram of example operations for receiving up-to-date roaming status information and outputting CDRs including the up-to-date roaming status information. As shown in FIG. 4, roaming status determination component 250 may receive an indication that an MMS message has been sent from a sender user device 210 to a recipient user device 210 (at 410). The indication may include user IDs of the sender user device 210 and the recipient user device 210. Based on receiving this indication, roaming status determination component 250 may request the roaming status of user device 210-1 and user device 210-2 from roaming status directory 255 (at 415). The request may include the user IDs of sender user device 210 and recipient user device 210.

In FIG. 4, assume that the roaming status of sender user device 210 and recipient user device 210 is unavailable. Given this assumption, roaming status directory 255 may output a response indicating that the roaming statuses of sender user device 210 and recipient user device 210 are unavailable (at 420). Roaming status determination component 250 may then request the roaming status of sender user device 210 and recipient user device 210 from HSS/AAA server 235 (at 425). For example, the request may include the user IDs of sender user device 210 and recipient user device 210. Roaming status determination component 250 may request the roaming statuses from "home" HSS/AAA servers 235 associated with sender user device 210 and recipient user device 210. If sender user device 210 and recipient user device 210 are associated with different home HSS/AAA server 235, then roaming status determination component 250 may request the roaming status from a home HSS/AAA server 235 of sender user device 210, and request the roaming status from a different home HSS/AAA server 235 of recipient user device 210. For clarity, only one HSS/AAA server 235 is shown. In practice, multiple HSS/AAA servers 235 may be involved when requesting the roaming status of sender user device 210 and recipient user device 210.

HSS/AAA server 235 may output the roaming statuses of sender user device 210 and recipient user device 210 to roaming status determination component 250 (at 430). Roaming status determination component 250 may output the roaming statuses to roaming status directory 255 (at 435), and roaming status directory 255 may store the roaming statuses for sender user device 210 and recipient user device 210 (at 440).

Roaming status determination component 250 may then generate a CDR for sender user device 210 (at 445). The CDR may include the roaming status of sender user device 210. Roaming status determination component 250 may output the CDR of sender user device 210 to billing system 257 (at 450), and billing system 257 may charge an account of sender user device 210 based on the roaming status of sender user device 210 (at 455). For example, if the roaming status indicates that sender user device 210 was roaming when the MMS message was sent, billing system 257 may charge the account of sender user device 210 at a particular rate for the transmission of the MMS message (e.g., a "roaming MMS message rate"). Additionally, or alternatively, billing system 257 may deduct a "roaming MMS message credit" from the account of sender user device 210 (e.g., when a user of sender user device 210 has subscribed to a package that includes a particular amount of roaming MMS message credits). Additionally, or alternatively, billing system 257 may not charge the account of sender user device 210, and may simply store the CDR for record keeping purposes (e.g., if the user of sender user device 210 has subscribed to a package that includes unlimited roaming MMS message credits).

If the roaming status indicates that sender user device 210 was not roaming when the MMS message was sent, billing system 257 may charge the account of sender user device 210 at a "non-roaming MMS message rate"). Additionally, or alternatively, billing system 257 may deduct a "non-roaming MMS message credit" from the account of sender user device 210 (e.g., when a user of sender user device 210 has subscribed to a package that includes a particular amount of non-roaming MMS message credits). Additionally, or alternatively, billing system 257 may not charge the account of sender user device 210, and may simply store the CDR for record keeping purposes (e.g., if the user of sender user device 210 has subscribed to a package that includes unlimited non-roaming MMS message credits).

Since the roaming status of sender user device 210 and recipient user device 210 was previously unavailable (e.g., as indicated by the response at 420), roaming status determination component 250 may output a request to subscribe to roaming status updates for sender user device 210 and recipient user device 210 (at 460). When the roaming status for sender user device 210 and/or recipient user device 210 is updated, HSS/AAA server 235 may output information identifying the updated roaming status (at 465). Roaming status determination component 250 may then output the information identifying the roaming status update to roaming status directory 255, and roaming status directory 255 may store the updated roaming status (475). As such, roaming status directory 255 may store up-to-date roaming statuses for sender user device 210 and recipient user device 210 so that roaming status determination component 250 may identify the up-to-date roaming statuses when sender user device 210 and/or recipient user device 210 send and/or retrieve MMS messages.

Referring to FIG. 5, roaming status determination component 250 may receive an indication that recipient user device 210 has retrieved the MMS message from MMSC 245 (at 510). Based on receiving this indication, roaming status determination component 250 may request the roaming status of recipient user device 210 from roaming status directory 255 (at 515). Since the roaming status of recipient user device 210 has been previously stored (e.g., at 440, and/or updated at 475), roaming status directory 255 may provide roaming status determination component 250 with the roaming status of recipient user device 210 (at 520). Roaming status determination component 250 may then generate a CDR for recipient user device 210 identifying the roaming status of recipient user device 210 at the time recipient user device 210 retrieved the MMS message from MMSC 245 (at 525). Roaming status determination component 250 may then output the CDR to billing system 257 (at 530). Billing system 257 may then charge an account of recipient user device 210 based on the roaming status identified in the CDR (at 535).

Referring to FIG. 6, assume that roaming status determination component 250 has subscribed to receive roaming status updates for sender user device 210 and recipient user device 210. Given this assumption, HSS/AAA server 235 may output roaming status updates for sender user device 210 and/or recipient user device 210 (at 610). Roaming status determination component 250 may output the roaming status updates to roaming status directory 255 (at 615), and roaming status directory 255 may store the roaming status updates (at 620). When sender user device 210 sends an MMS message to recipient user device 210, roaming status determination component 250 may receive an indication that the MMS message has been sent (at 625). Roaming status determination component 250 may request the roaming status of sender user device 210 and recipient user device 210 from roaming status directory 255 (at 630), and roaming status directory 255 may output the roaming statuses of sender user device 210 and recipient user device 210 (at 635). Roaming status determination component 250 may generate a CDR for sender user device 210 indicating the roaming status of sender user device 210 at the time the MMS message was sent (at 640). Roaming status determination component 250 may send the CDR to billing system 257 (at 645), and billing system 257 may charge the account of sender user device 210 based on the roaming status indicated in the CDR (at 650).

Roaming status determination component 250 may receive an indication when recipient user device 210 retrieves the MMS message from MMSC 245 (at 655). Based on receiving this indication, roaming status determination component 250 may request the roaming status of recipient user device 210 from roaming status directory 255. Since the roaming status of recipient user device 210 has been previously stored and/or updated, roaming status directory 255 may provide roaming status determination component 250 with the roaming status of recipient user device 210 (at 665). Roaming status determination component 250 may then generate a CDR for recipient user device 210 identifying the roaming status of recipient user device 210 at the time recipient user device 210 retrieved the MMS message from MMSC 245 (at 670). Roaming status determination component 250 may then output the CDR to billing system 257 (at 675). Billing system 257 may then charge an account of recipient user device 210 based on the roaming status identified in the CDR (at 680). If the roaming status of recipient user device 210 changes from the time that the roaming status of recipient user device 210 was previously stored by roaming status directory 255, and the time that recipient user device 210 retrieves the MMS message from MMSC 245, roaming status directory 255 may receive the updated roaming status prior to when recipient user device 210 retrieves the MMS message (e.g., since recipient user device 210 may not retrieve the MMS message without first registering with HSS/AAA server 235, and without HSS/AAA server 235 first outputting the updated roaming status of recipient user device 210 to roaming status directory 255, via roaming status determination component 250).

Figure 7:
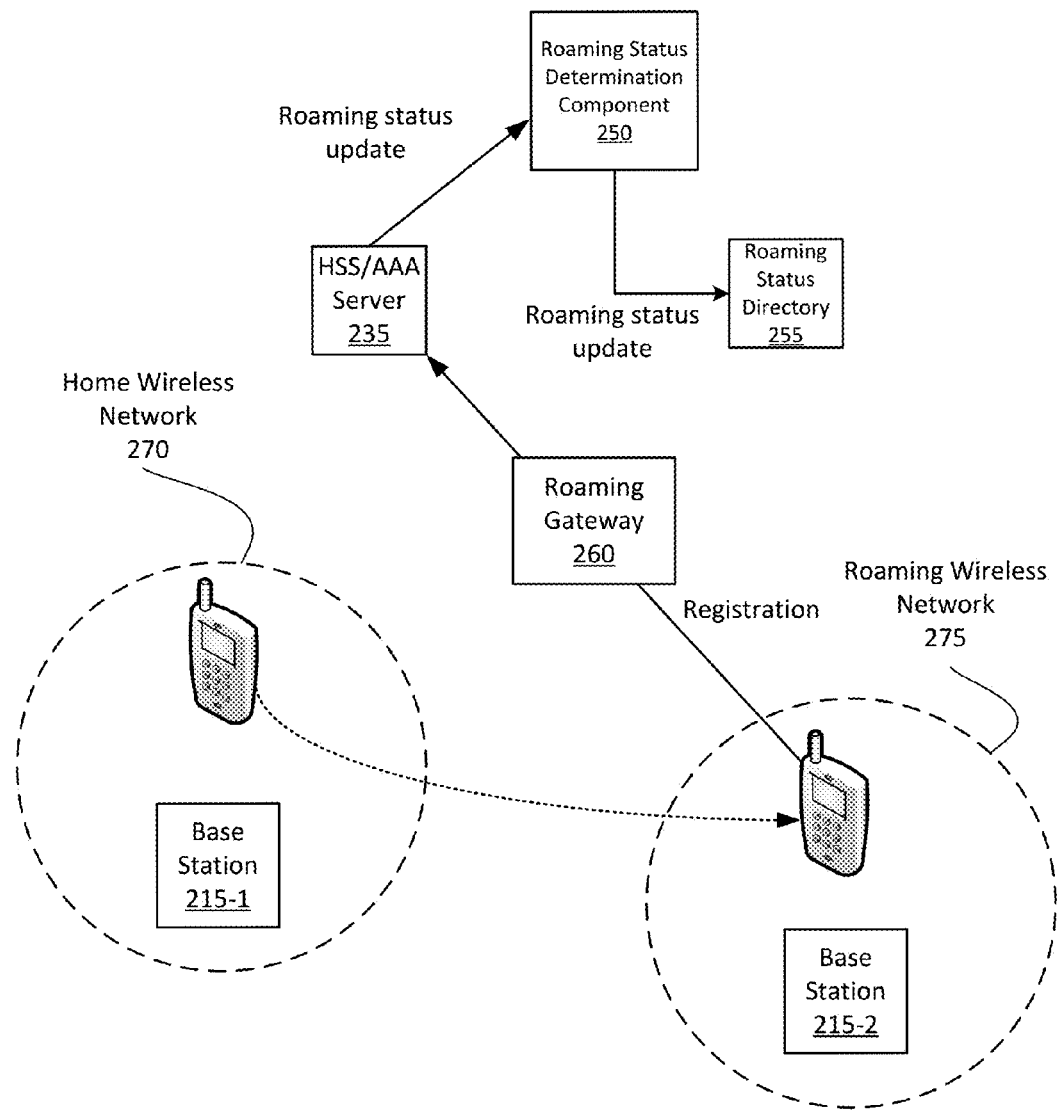
FIGS. 7 and 8 illustrate an example implementation for updating the roaming status of a user device as the user device travels in and out of communications range of home and roaming wireless networks.
Figure 8:
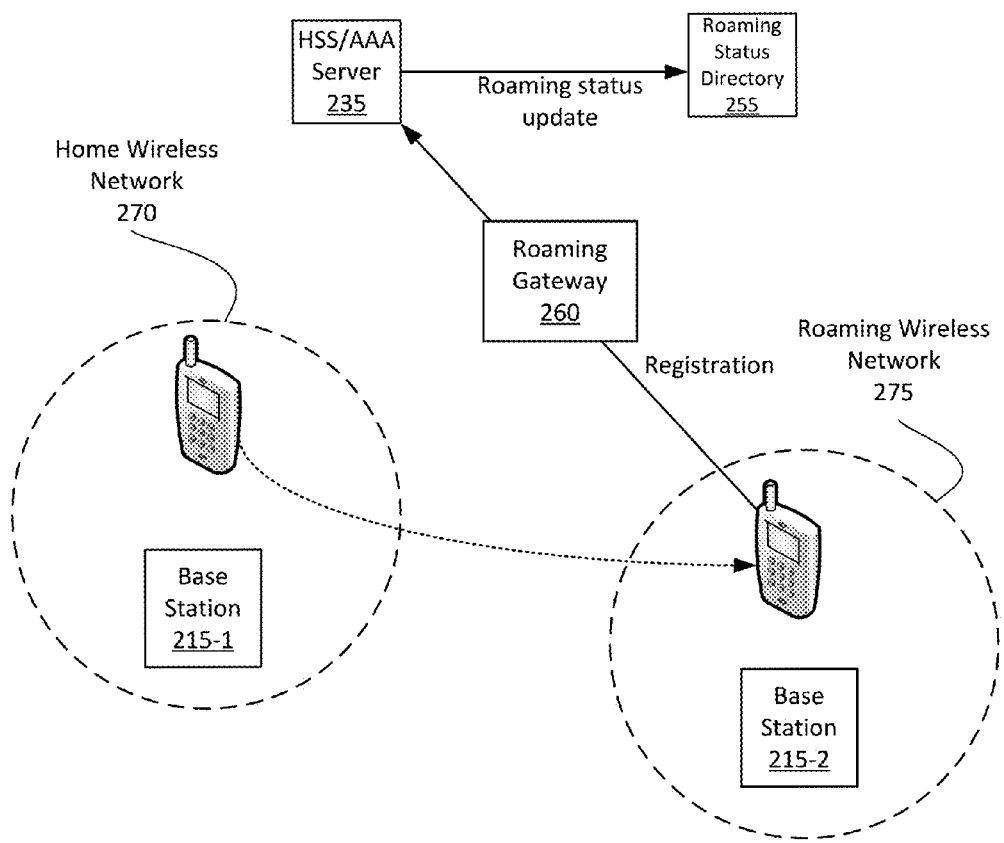

FIGS. 7 and 8 illustrate an example implementation for updating the roaming status of a user device as the user device travels in and out of communications range of home and roaming wireless networks. In FIGS. 7 and 8, assume that roaming status determination component 250 has subscribed to receive roaming status updates for user device 210. As shown in FIG. 7, user device 210 may travel from within a communications range of a base station 215 associated with home wireless network 270 (e.g., base station 215-1) to within a communications range of a base station 215 associated with roaming wireless network 275 (e.g., base station 215-2). When user device 210 attaches to base station 215-2, user device 210 may register with HSS/AAA server 235 (e.g., via roaming status directory 255). HSS/AAA server 235 may then output information identifying the change in roaming status of user device 210 to roaming status determination component 250.

Roaming status determination component 250 may then output the information identifying the change in roaming status of user device 210 to roaming status directory 255. As a result, roaming status determination component 250 may receive the most up-to-date roaming status of user device 210, and provide information identifying the roaming status updates to roaming status directory 255 for storage. When user device 210 is used to send or receive an MMS message, roaming status determination component 250 may communicate with roaming status directory 255 to determine the most up-to-date roaming status of user device 210. Roaming status determination component 250 may then generate a CDR indicating the roaming status of user device 210 when user device 210 sends or receives the MMS message.

Referring to FIG. 8, HSS/AAA server 235 may output information identifying the change in roaming status of user device 210 (e.g., when user device 210 travels from a communications range of base station 215-1 to base station 215-2). HSS/AAA server 235 may output the information identifying the change in roaming status of user device 210 directly to roaming status directory 255 without involving roaming status determination component 250. As a result, roaming status directory 255 may receive the most up-to-date roaming status of user device 210. When user device 210 is used to send or receive an MMS message, roaming status determination component 250 may communicate with roaming status directory 255 to determine the most up-to-date roaming status of user device 210. Roaming status determination component 250 may then generate a CDR indicating the roaming status of user device 210 when user device 210 sends or receives the MMS message.

Figure 9:
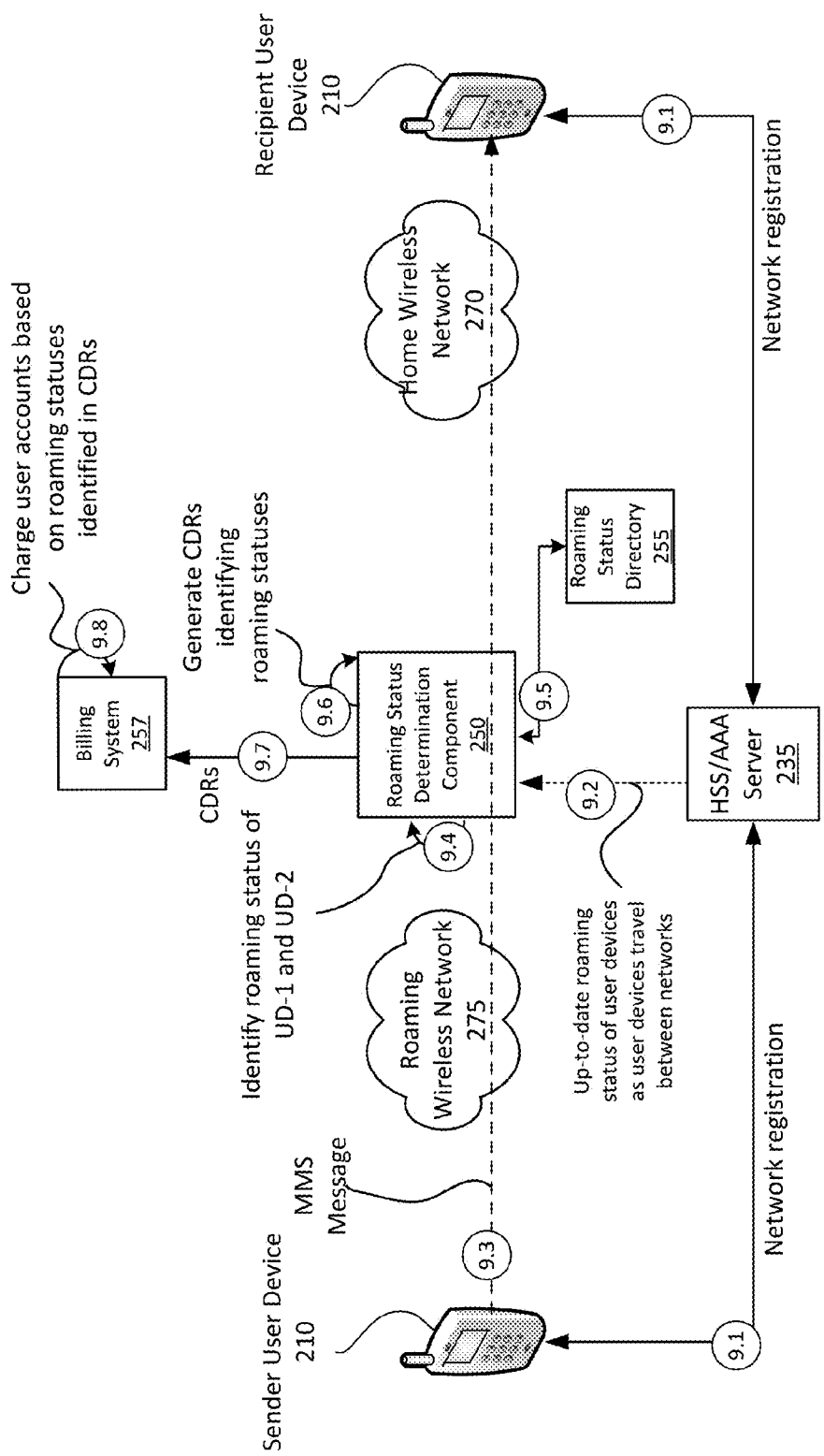
FIG. 9 illustrates an example implementation for identifying up-to-date roaming statuses of user devices associated with an MMS message.

FIG. 9 illustrates an example implementation for generating CDRs identifying up-to-date roaming statuses of user devices associated with an MMS message. As shown in FIG. 9, sender user device 210 and recipient user device 210 may each register with HSS/AAA server 235 indicating respective wireless networks which sender user device 210 and recipient user device 210 are connected (arrows 9.1). For example, sender user device 210 may register with HSS/AAA server 235 when sender user device 210 attaches to a base station 215 associated with roaming wireless network 275. Recipient user device 210 may register with HSS/AAA server 235 when recipient user device 210 attaches to a base station 215 associated with home wireless network 270.

For clarity, only one HSS/AAA server 235 is shown in FIG. 9. In practice, sender user device 210 and recipient user device 210 may be associated with different HSS/AAA server 235, and sender user device 210 and recipient user device 210 may register with their respective home HSS/AAA servers 235 as sender user device 210 and recipient user device 210 attach to different base stations 215 associated with different networks (e.g., roaming and home networks).

HSS/AAA server 235 may output, to roaming status determination component 250 (arrow 9.2), up-to-date roaming status of sender user device 210 and recipient user device 210 as user devices 210-1 and 210-2 travel between roaming and home wireless networks and register with HSS/AAA server 235 via roaming and home wireless networks.

As further shown in FIG. 9, sender user device 210 may send an MMS message destined for recipient user device 210 (arrow 9.3). Roaming status determination component 250 may receive an indication when the MMS message is sent, and may identify the roaming statuses of sender user device 210 and recipient user device 210 by communicating with roaming status directory 255 (arrows 9.4 and 9.5). Roaming status determination component 250 may then generate CDRs indicating the roaming statuses of sender user device 210 and recipient user device 210 (arrow 9.6). For example, roaming status determination component 250 may generate a CDR indicating that sender user device 210 was in a roaming state when sender user device 210 sent the MMS message. When recipient user device 210 requests the message from MMSC 245, roaming status determination component 250 may generate another CDR indicating that recipient user device 210 was in a non-roaming state. Roaming status determination component 250 may then output the CDRs to billing system 257 (arrow 9.7), and billing system 257 may charge the accounts of sender user device 210 and recipient user device 210 accordingly (arrow 9.8).

Figure 10:
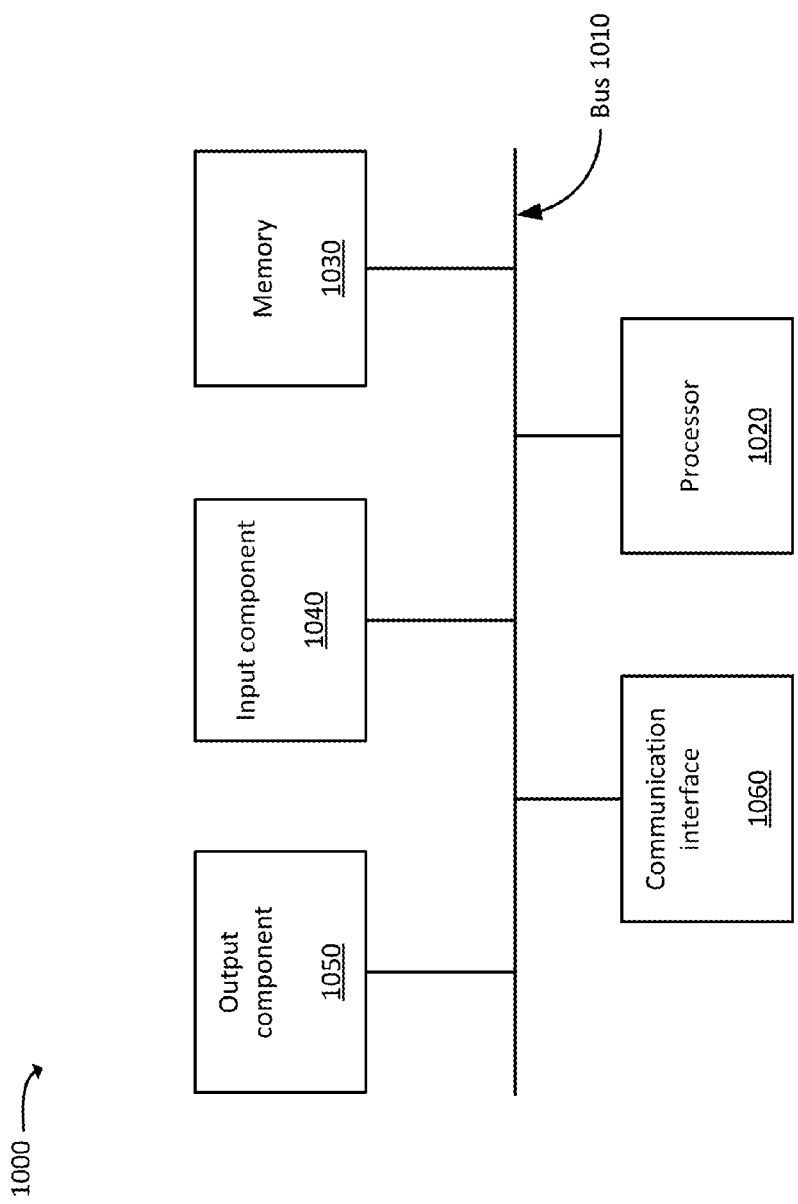
FIG. 10 illustrates example components of one or more devices, according to one or more implementations described herein.

FIG. 10 is a diagram of example components of device 1000. One or more of the devices described above (e.g., with respect to FIGS. 1, 2A, 2B, and 4-9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks and/or signal flows have been described with regard to FIGS. 3-6, the order of the blocks and/or signal flows may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2A, 2B, and 4-9), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a first device, an indication that a multimedia message service (MMS message) message has been sent from a first user device to a second user device;
   obtaining, by the first device and from a second device, a roaming status of the first user device at a time that the MMS message was sent by the first user device,
      the roaming status of the first user device having been pushed to the second device, by a third device, prior to the indication being received by the first device,
      wherein the first device obtains the roaming status of the first user device from the second device based on receiving the indication;
   generating, by the first device, a call details record (CDR) indicating the obtained roaming status of the first user device at the time the MMS message was sent by the first user device; and
   storing or outputting, by the first device, the CDR to a billing system that charges an account, associated with the first user device, for the sent MMS message, wherein an amount charged is based on the roaming status of the first user device at the time at which MMS message was sent by the first user device.

2. The method of claim 1, wherein obtaining the roaming status of the first user device includes:
   outputting a request, to the second device, for the roaming status of the first user device; and
   receiving, from the second device and in response to the request, the roaming status of the first user device.

3. The method of claim 1, wherein the CDR is a first CDR, the method further comprising:
   receiving an indication that the MMS message has been retrieved by the second user device;
   determining the roaming status of the second user device at the time of receiving the indication that the MMS message has been retrieved by the second user device;
   generating a second CDR identifying the determined roaming status of the second user device; and
   storing or outputting, the second CDR to a billing system that charges a second account, associated with the second user device, for retrieved MMS message, wherein an amount charged to the second account is based on the roaming status of the second user device at the time at which the MMS message was retrieved by the second user device.

4. The method of claim 1, wherein the first device is communicatively coupled with or is implemented as part of a multimedia messaging service center (MMSC).

5. The method of claim 1, wherein the third device is at least one of a home subscriber server (HSS) server or an authentication, authorization, accounting (AAA) server.

6. The method of claim 1, further comprising:
   determining whether the roaming status of the first user device is stored by the first device at the time the MMS message was sent by the first user device,
      wherein obtaining the roaming status from the second device is based on determining that the roaming status of the first user device is not stored by the first device at the time the MMS message was sent by the first user device;
   requesting, based on determining that the roaming status of the first user device is not stored by the first device at the time the MMS message was sent by the first user device, the second device to output roaming status updates to the first device; and
   obtaining the roaming status from a storage of the first device based on determining that the roaming status of the first user device is stored by the first device at the time the MMS message was sent by the first user device.

7. A system comprising:
   a first device, comprising:
      a non-transitory memory device storing:
         a plurality of processor-executable instructions; and
      a processor configured to execute the processor-executable instructions, wherein executing the processor-executable instructions causes the processor to:
         receive an indication that a multimedia message service (MMS message) message has been sent from a first user device to a second user device;
         obtain, from a second device, a roaming status of the first user device at a time that the MMS message was sent by the first user device
            the roaming status of the first user device having been pushed to the second device, by a third device, prior to the indication being received by the first device,
            wherein the first device obtains the roaming status of the first user device from the second device based on receiving the indication;
         generate a call details record (CDR) indicating the obtained roaming status of the first user device at the time the MMS message was sent by the first user device; and
         store or output the CDR to a billing system that charges an account, associated with the first user device, for the sent MMS message, wherein an amount charged is based on the roaming status of the first user device at the time at which MMS message was sent by the first user device.

8. The system of claim 7, wherein executing the processor-executable instructions, to obtain the roaming status of the first user device, causes the processor to request the roaming status of the first user device from the second device.

9. The system of claim 7, wherein the CDR is a first CDR, wherein executing the processor-executable instructions further causes the processor to:
receive an indication that the MMS message has been retrieved by the second user device;
determine the roaming status of the second user device at the time of receiving the indication that the MMS message has been retrieved by the second user device;
generate a second CDR identifying the determined roaming status of the second user device; and
store or output, the second CDR to a billing system that charges a second account, associated with the second user device, for retrieved MMS message, wherein an amount charged to the second account is based on the roaming status of the second user device at the time at which the MMS message was retrieved by the second user device.

10. The system of claim 7, wherein the first device is communicatively coupled with or is implemented as part of a multimedia messaging service center (MMSC).

11. The system of claim 7, wherein the third device is at least one of a home subscriber server (HSS) server or an authentication, authorization, accounting (AAA) server.

12. The system of claim 7, wherein executing the processor-executable instructions further causes the processor to:
determine whether the roaming status of the first user device is stored by the first device at the time the MMS message was sent by the first user device,
wherein executing the processor-executable instructions, to obtain the roaming status from the second device, causes the processor to obtain the roaming status based on determining that the roaming status of the first user device is not stored by the first device at the time the MMS message was sent by the first user device;
request, based on determining that the roaming status of the first user device is not stored by the first device at the time the MMS message was sent by the first user device, the second device to output roaming status updates to the first device; and
obtain the roaming status from a storage of the first device based on determining that the roaming status of the first user device sis stored by the first device at the time the MMS message was sent by the first user device.

13. A method comprising:
receiving, by a first device, an indication that a multimedia message service (MMS) message, sent from a first user device to a second user device, has been retrieved by the second user device;
obtaining, by the first device and from a second device, a roaming status of the second user device at a time the MMS message was retrieved by the second user device the roaming status of the first user device having been pushed to the second device, by a third device, prior to the indication being received by the first device,
wherein the first device obtains the roaming status of the first user device from the second device based on receiving the indication;
generating, by the first device, a call details record (CDR) indicating the obtained roaming status of the second user device at the time the MMS message was retrieved by the second user device; and
storing or outputting, by the first device, the CDR to a billing system that charges an account, associated with the second user device, for the retrieved MMS message, wherein an amount charged is based on the roaming status of the second user device at the time at which the MMS message was retrieved by the second user device.

14. The method of claim 13, wherein obtaining the roaming status of the second user device includes requesting the roaming status of the second user device from the second device.

15. The method of claim 13, wherein the CDR is a first CDR, the method further comprising:
receiving an indication that the MMS message has been sent by the first user device;
determining the roaming status of the first user device at the time that the MMS message was sent by the first user device;
generating a second CDR identifying the determined roaming status of the first user device; and
storing or outputting, the second CDR to a billing system that charges a second account, associated with the first user device, for sent MMS message, wherein an amount charged to the second account is based on the roaming status of the first user device at the time at which MMS messages were sent by the first user device.

16. The method of claim 13, wherein the first device is communicatively coupled with or is implemented as part of a multimedia messaging service center (MMSC).

17. The method of claim 13, wherein the third device is at least one of a home subscriber server (HSS) server or an authentication, authorization, accounting (AAA) server.

18. The method of claim 13, wherein the roaming status of the first user device is pushed by the third device to the second device based on a change in the roaming status of the first device.

19. The method of claim 1, wherein the roaming status of the first user device is pushed by the third device to the second device based on a change in the roaming status of the first device.

20. The system of claim 7, wherein the roaming status of the first user device is pushed by the third device to the second device based on a change in the roaming status of the first device.

* * * * *